United States Patent [19]

Chou et al.

[11] Patent Number: 4,957,599
[45] Date of Patent: Sep. 18, 1990

[54] ALKALINE EXTRACTION, PEROXIDE BLEACHING OF NONWOODY LIGNOCELLULOSIC SUBSTRATES

[75] Inventors: Yu-Chia T. Chou, Wilmington, Del.; David F. Garrison, Mullica Hill, N.J.; William I. Lewis, Burlington, Canada

[73] Assignee: E. I. du Pont de Nemours and Company, Wilmington, Del.

[21] Appl. No.: 450,908

[22] Filed: Dec. 8, 1989

Related U.S. Application Data

[63] Continuation of Ser. No. 181,774, Apr. 15, 1988, abandoned.

[51] Int. Cl.[5] ................................................ D21C 3/02
[52] U.S. Cl. ........................................ 162/78; 162/60; 162/90; 162/91; 162/97; 162/98; 162/99; 426/615
[58] Field of Search ..................... 162/91, 90, 99, 98, 162/97, 60, 78, 14; 426/615

[56] References Cited

U.S. PATENT DOCUMENTS

| | | | |
|---|---|---|---|
| 1,251,614 | 1/1918 | Anders | 162/78 |
| 1,588,335 | 6/1926 | Puttaert et al. | 162/99 |
| 2,487,114 | 11/1949 | Dreyfus | 162/78 |
| 2,615,883 | 10/1952 | Sweeney et al. | 162/14 |
| 3,382,149 | 5/1968 | Hoh | 162/78 |
| 3,676,150 | 7/1972 | Glicksman et al. | 99/90 |
| 3,767,423 | 10/1973 | Tsantir et al. | 426/62 |
| 3,939,286 | 2/1976 | Jelks | 426/312 |
| 4,187,141 | 2/1980 | Ahrel | 162/78 |
| 4,219,580 | 8/1980 | Torres | 426/549 |
| 4,237,170 | 12/1980 | Satin | 426/21 |
| 4,462,864 | 7/1984 | Carles et al. | 162/56 |
| 4,649,113 | 3/1987 | Gould | 435/165 |

FOREIGN PATENT DOCUMENTS

| | | | |
|---|---|---|---|
| 194982 | 9/1986 | European Pat. Off. | 162/78 |
| 0228951 | 7/1987 | European Pat. Off. | |
| 576510 | 4/1946 | United Kingdom | 162/78 |

OTHER PUBLICATIONS

Schumb et al., *Hydrogen Peroxide*, ACS Monograph Series, Chapter 9, pp. 515–547 (1955).
Gould, *Biotechnology and Bioengineering*, vol. 27, pp. 225–231 (1985)—"Studies on the Mechanism of Alkaline Peroxide Delignification of Agricultural Residues".

*Primary Examiner*—Peter Chin
*Attorney, Agent, or Firm*—Charles E. Krukiel

[57] ABSTRACT

An improved process for delignifying and bleaching nonwoody, lignocellulosic material into products digestible by ruminants and ingestible by humans. The process comprises treating the substrate in an alkaline solution for a period of time, separating the wetted substrate from the slurry and then treating the wetted substrate with an alkaline peroxide solution at an initial pH of 8.5 to 11.0 for a period of time, and separating, washing and drying the product.

20 Claims, No Drawings

ALKALINE EXTRACTION, PEROXIDE BLEACHING OF NONWOODY LIGNOCELLULOSIC SUBSTRATES

This application is a continuation of application Ser. No. 07/181,774 filed Apr. 15, 1988 abandoned.

FIELD OF INVENTION

This invention relates to an improved alkaline peroxide treatment process for delignifying and bleaching nonwoody lignocellulosic agricultural residues, and more particularly to such a process for converting such residues into cellulosic fiber products suitable as a source of both reduced calorie dietary fiber for human consumption and carbohydrates for ruminant and microbe consumption.

The reduced calorie dietary fiber is characterized by high dietary fiber content and low contents of proteinaceous, fatty and ash-forming materials. It is suitable as a substitute for farinaceous flour at high replacement levels.

BACKGROUND

Various processes are known for converting woody and nonwoody lignocellulosic substrates into fibrous products suitable for ingestion by animals and humans.

Cattle, sheep and other ruminants are able to digest and grow on many kinds of cellulosic plant materials that provide little or no nourishment to humans and other monogastrics. Even the ruminants, however, have limited ability to efficiently digest lignocellulosic materials such as the leaves and stalks of grain-bearing grasses and the husks and hulls of the grain. This low conversion efficiency has been attributed to the close association of lignin with the cellulosic and hemicellulosic fibers in these materials. This lignin makes these cellulosics largely unavailable for digestion by the digestive juices and the microbes that inhabit ruminant stomachs. (See Jelks, U.S. Pat. No. 3,939,286 and Gould, U.S. Pat. No. 4,649,113).

Human inability to digest and assimilate cellulose and hemicellulose makes the substrates attractive as potential sources of dietary fiber. But, widespread use for this purpose has been hampered by the lignin that envelops the cellulosic fibers, by the highly crystalline character of the fibers and by the presence of components such as fatty substances (fats and oils) and ash-forming substances (including silicaceous materials). The crystalline character imparts undesirable physical properties to foodstuffs and the fatty and ash-forming substances, especially when used in relatively high proportions, adversely effect the aroma, taste, texture and mouthfeel of food products.

One lignocellulosic material used as a dietary fiber is bran, the unbleached coarse outside covering of the seeds or kernels of cereal grains. Bran is used as fiber or roughage in some breakfast foods, breads and muffins. But, most of the bran is used in animal food, primarily because its high non-cellulosic content adds undesirable properties to many kinds of baked goods, particularly to white bread.

Low calorie flour substitutes made by grinding hulls of oats and other cereal grains (see Tsantir et al., U.S. Pat. No. 3,767,423) contain relatively large proportions of non-cellulosic components such as ash-forming substances. At desirably high flour replacement levels, food products in which they are used have a gritty aftertaste. For this reason, commercial interest has shifted largely to purified cellulose as a dietary fiber for human consumption.

Two forms of purified cellulose, both derived from wood products, are currently available. They are crystalline alpha cellulose, sold under the trade name "Solka-Floc", and microcrystalline cellulose, derived from alpha cellulose, sold under the trade name "Avicel". These products, however, are not entirely satisfactory as flour substitutes (See Glicksman et al., U.S. Pat. No. 3,676,150; Satin, U.S. Pat. No. 4,237,170; Tsantir et al., U.S. Pat. No. 3,767,423; and Torres, U.S. Pat. No. 4,219,580). The taste and texture of baked goods is adversely effected at flour replacement levels greater than about 20 percent.

Gould, U.S. Pat. No. 4,649,113 (1987), discloses a process (Gould Process) for converting nonwoody lignocellulosic agricultural residues (substrate) such as wheat straw into cellulosic fiber products digestible by ruminants and microbes. Gould et al., European Patent Application No. 228951 (1987), discloses that the delignified fiber products of U.S. Pat. No. 4,649,113 are also suitable as noncaloric fiber additives to compositions intended for consumption by humans.

The Gould Process involves slurrying the substrate in aqueous hydrogen peroxide ($H_2O_2$) and alkali (NaOH) at a pH of 11.2 to 11.8 and a temperature of 5° to at least 60° C. The substrate is sufficiently delignified exposing virtually all the cellulosic carbohydrates. During the alkaline peroxide treatment, the pH of the reaction medium drifts upward and is controlled by the addition of acid. The $H_2O_2$ assists in the delignification of the substrate by oxidizing and degrading lignin to low molecular weight water-soluble compounds, principally carboxylic acids.

Gould et al. teaches that the products can serve as wheat flour substitutes at high (30% or more) replacement levels.

Although attractive as a means of converting substrates to food formulations for ruminants and humans, the Gould Process is not entirely satisfactory for commercial use. It requires rather high concentrations of both $H_2O_2$ and NaOH based on the substrate and suffers high losses of $H_2O_2$ through nonfunctional (nonproductive) decomposition to oxygen gas ($2 H_2O_2 \rightarrow 2 H_2O + O_2$). Also, we have found that the process when used to treat difficult substrates such as oat hulls results in a rapid decrease in the concentration of the $H_2O_2$, accompanied by excessive initial foaming of the reaction mixture, and the production of products that have undesirable quality (brightness, taste and aroma) for human consumption.

Decomposition of $H_2O_2$ in a highly alkaline heterogeneous reaction medium, such as when a particulate substrate is present, is not too surprising for a couple of reasons. First, $H_2O_2$ is known to be unstable in alkali, particularly at high pH. Second, heterogeneous $H_2O_2$ decomposition into $H_2O$ and $O_2$ (catalyzed by solid surfaces) is generally far faster than homogeneous decomposition (catalyzed by a variety of soluble, mostly cationic substrates), with the rate increasing in proportion to the surface area of the solids (see Schumb et al., *Hydrogen Peroxide*, ACS Monograph Series, New York, Rheinhold (1955) pp 521–522).

In a copending application to Jayawant (CH-1459) assigned to E. I. du Pont de Nemours & Company, an improvement over the process of U.S. Pat. No. 4,649,113 is taught for converting nonwoody substrates, particularly nonwoody lignocellulosic agricultural residues, into cellulosic fiber products useful as a source of carbohydrates digestible by ruminants and as a source of low calorie dietary fiber ingestible by humans. The process broadly comprises treating lignocellulosic substrates in an aqueous solution of strong alkali (Alkaline, Peroxide-Free Stage) for a period of time prior to the addition of peroxide (Alkaline-Peroxide Stage). Both the copending application and U.S. Pat. No. 4,649,113 are incorporated herein by reference.

BRIEF DESCRIPTION OF THE INVENTION

It has now been found that by separating the wetted substrate from the Alkaline, Peroxide-Free Stage of the copending application to Jayawant (CH-1459) and then reslurrying it in an Alkaline-Peroxide Stage instead of adding Peroxide to the Alkaline, Peroxide-Free Stage at a pH of about 10.2 to 11.8 that the following benefits result:

(a) A significant decrease in the consumption of peroxide and alkali;

(b) Improved bake scores when the product is substituted for regular flour at high replacement levels;

(c) Increased product yield based on both chemicals and substrate utilization;

(d) Increased removal of fatty substances which otherwise become oxidized to rancid smelling and tasting by-products; and (e) Savings in chemical, water, waste treatment and energy cost due to the ability to repeatedly recycle both peroxide and alkali and to concentrate organics in the recycle streams.

The delignified and bleached cellulosic fiber products are suitable flour substitutes in particularly high replacement levels since they are high in dietary fiber, substantially free of nutritive proteinaceous and fatty components and ash-forming, especially siliceous, components. They can be used as farinaceous flour substitutes in replacement levels exceeding 20 percent by weight of the flour and can be used at significantly higher levels, for example 40%. The foods made from the the resulting flour meet baking standards, having good aroma, texture and mouthfeel.

The process is effective with various substrates, but is particularly effective with substrates such as straws and flax shives. The brightness of straws and flax shives is substantially increased when the alkaline liquid from the Alkaline, Peroxide-Free Stage is removed prior to reslurrying and adding peroxide in the Alkaline-Peroxide Stage. By removing the alkaline liquid, much of undesirable materials such as fats, ash-forming compounds and peroxide decomposition catalysts or peroxide consuming compounds are removed with the alkaline liquid. Rapid decrease in peroxide concentration and resultant initial foaming in subsequent steps is thus minimized. The Alkaline-Peroxide Stage can be run at a pH of 8.5 to 11.0, reducing consumption of peroxide.

The process substantially removes lignins and the nutritive proteinaceous and fatty contents of the substrate and the ash-forming content. Low calorie dietary fiber that can be used in high replacement concentrations as a flour substitute can be made. The foods made from the the resulting flour have good aroma, texture and mouthfeel.

DETAILED DESCRIPTION OF INVENTION

The invention comprises an improved process for converting a nonwoody lignocellulosic material (Substrate) into products digestible by ruminants and ingestible by humans. The process comprises the following steps:

(a) forming a slurry of the substrate with aqueous alkali in an amount at least sufficient to wet the substrate, the alkali present in an amount greater than about 1 percent and preferably between about 1 and 15 percent of the dry weight of the substrate and the slurry being substantially free of peroxide (Alkaline, Peroxide-Free Stage);

(b) maintaining the slurry of step (a) for a sufficient time at 25° to 100° C. for the alkali to uniformly wet the substrate;

(c) separating the wetted substrate from the slurry and, optionally washing with water;

(d) contacting the separated substrate with an alkaline peroxide solution at an initial pH of about 8.5 to 11.0 (Alkaline-Peroxide Stage);

(e) maintaining the substrate at a temperature and for a sufficient time in contact with the alkaline peroxide solution while allowing the pH to become lower as the step progresses to produce a substantially bleached, cellulosic fiber (Product); and (f) separating the Product from the alkaline-peroxide liquid (Separation Stage).

The alkaline liquid removed in step (c) and the alkaline-peroxide liquid removed in step (f) may be recycled to steps (a) and (d), respectively. Fresh alkali and peroxide may be added as needed. Since the streams will continue to strip undesirable materials from the substrate, periodic purging is preferred.

For the production of ruminant feedstuff supplements, it is only necessary to sufficiently delignify the substrate to expose substantially all the cellulosic and hemicellulosic components. The presence of residual proteins, fats, oils and ash-forming substances are of little consequence in the production and acceptability of such feedstuff supplements.

For human dietary fiber products, in addition to removal of lignin, removal of residual nutritive proteins, fats, oils and ash-formers is important. Reducing the nutritive content is needed if the product is to qualify as "dietary", that is, as a low calorie or non-fattening food. Reducing fats, particularly unsaturated fats, is needed to avoid objectionable aroma and a rancid taste in baked goods. Reducing the ash-forming substances is needed to avoid objectionable mouthfeel (gritty taste and texture) in baked goods.

THE SUBSTRATE

The substrate is a nonwoody lignocellulosic material, preferably an agricultural residue. Agricultural residue includes those portions of grassy plants of the family Gramineae remaining after harvesting. Typically, leaves and stalks and the husks and hulls of grain remain after harvesting.

The substrate can be a straw such as barley straw, flax straw, oat straw, rice straw, rye straw and wheat straw. It can be the corn stalks, corn cobs and corn husks. It can be bagasse, the portion remaining after the harvesting of sugar cane. It can be the hulls of cereal grains such as barley, oats and rice. It can also be other nonwoody lignocellulosic materials such as grasses not normally cultivated for agricultural purposes.

The cereal grain hulls, oat hulls in particular, are preferred for making low-calorie flour substitutes because of the general acceptance of the cereal grains as foods for humans.

Hulls generally have a high fatty substance or oil content and a high ash-forming or silica content whereas straw and bagasse typically have low oil but high silica content.

Oat hulls and the hulls of other cereal grains are composed largely of cellulose (25–30 wt. %), hemicellulose (45–50 wt. %) and lignin (6–11 wt. %). They also contain proteins (3–6 wt. %), fatty substances (1–2.5 wt. %), ash-forming components (3–6 wt. %, about 1/3 of which is silicaceous, calculated as $SiO_2$) and moisture (3–9 wt. %).

Straw typically has 35–40% cellulose, 30–35% hemicellulose, 15–18% lignin, 4–12% ash-forming substances, 2–4% protein and 3–10 % moisture. Typically straw has a low fat content as evidenced by the ether extractable fraction that is about 1 to 1.5 percent.

Bagasse typically has 30–40% cellulose, 30–35% hemicellulose, 18–22% lignin, 2–6% ash-forming substances, and 5–13% moisture. Typically bagasse has a low fat content as evidenced by the ether extractable fraction that is less than about 1 percent.

The substrate may in many cases be used as it comes from the field or may be subjected to one or more preparatory steps.

It is preferably comminuted, as by chopping, shredding or grinding, to increase its surface area and facilitate subsequent treatments with alkali and alkaline peroxide. It is particularly preferred, however, to avoid grinding the substrate too fine, since filtration, handling and drying problems result and yield loss increases. Therefore, comminution is most preferably by chopping or shredding. Comminuted substrates tend to yield brighter bleached products if residual liquid can be effectively removed from the substrate. If the substrate is ground too fine, high efficiency separation such as by centrifugation is needed to effectively remove liquid. High brightness is desired in flour substitutes for use in baking white bread. Fine grinding of the dried, bleached product is preferred if the product is to be used in low-calorie food.

It is preferably cleaned by cold water, hot water or by steam washing to remove foreign matter and debris. Hot water, steam washing or steaming also deactivates biological or enzymatic hydrogen peroxide decomposition catalysts such as catalase and helps in solubilizing water soluble inorganic salts or hydrogen peroxide decomposition catalysts, as well as organic sugars, acids and oxidizable compounds found in some substrates. Also, dilute acid washes are particularly useful, improving brightness, lowering the amount of undesirable components in the final product and improving chemical yields.

The preferred acid wash is performed with any non-toxic mineral or organic acid, preferably hydrochloric acid. The substrate may optionally be water or steam washed first. It is soaked in dilute acid at a pH of less than about 2.5, preferably about 2.0, for a sufficient time to fully soak the substrate, preferably about 15 minutes or more. The substrate is separated from the acid solution by standard means, slurried in water and then treated in the Alkaline, Peroxide-Free Stage.

ALKALINE, PEROXIDE-FREE STAGE

The first step in the process of this invention is to form a slurry of the substrate in aqueous alkali in the absence of peroxide. The substrate is held for a time at a temperature and conditions that assure uniform wetting with the alkali. The substrate swells and the protein, fats and silica are solubilized by the alkali.

Preferably, the substrate is first slurried in water and then enough alkali is added as a concentrated aqueous solution to provide a sufficient concentration of alkali in the slurry.

Sufficient alkali depends on the substrate being treated. For a given substrate, one skilled in the art can adjust the temperature of treatment, the time of treatment, the mixing efficiency and the alkali concentration to get the desired wetting and swelling and solubilizing of proteins, fats and silica.

Substrates such as oat hulls with their high silica content require higher alkali concentration than do substrates such as flax shives with their low silica content. In general, sufficient alkali is greater than about 1%, preferably between 1% and 15% alkali metal base, calculated as NaOH, based on the dry weight of the substrate. For substrates such as oat hulls that consume significant amounts of alkali, the concentration more preferably is 4% to 12% and still more preferably around 10%. For substrates such as flax shives that consume less alkali, the concentration more preferably is about 1% to 6% and still more preferably about 4%. Silica, fat, lignin and sugars all consume alkali.

The alkali is an alkali metal base, preferably a hydroxide or carbonate of sodium or potassium and more preferably NaOH. The alkali or its concentrated solution (40–50 weight %) can be added all at once or in increments, as may be needed, to maintain the desired pH throughout the alkalization of substrate in the absence of peroxide.

The consistency of the slurry (weight percent dry substrate in the slurry) is not critical. Preferably the slurry should be stirrable, but a plug flow reactor should be useful so long as the substrate can be fully and uniformly wetted. Preferred consistencies are about 5% to 30% and more preferably about 10% to 20%. In general, higher consistencies may be employed if the substrate is comminuted.

The slurry preferably is stirred in any conventional stirring apparatus, such as pipeline mixers, blenders, agitated vessel or recirculating pumps, to assure full and uniform wetting. Full and uniform wetting is indicated by the substrate swelling and becoming evenly dispersed and non-buoyant in the slurry.

The temperature for alkalizing the substrate in the absence of peroxide can vary broadly, say, about 25° to a temperature at which the liquid boils, but preferably will be about 60° to 85° C. and, more preferably, about 65° to 70° C.

The duration of this alkalizing phase may range from a few minutes to an hour or more depending on the substrate, the temperature, the alkali concentration and mixing efficiency. In general, shorter time of treatment is required for higher temperatures, greater alkali concentration or higher efficiency mixing. At 65° to 70° C., the substrate preferably is maintained in contact with the aqueous alkali under normal agitation for 5 minutes to two hours, more preferably 15 to 30 minutes. If a high efficiency mixer, such as a blender, is used, shorter times will be needed to fully and uniformly wet the substrate.

SEPARATION STEP

The Alkaline, Peroxide-Free Stage and the Separation Step may be run as a continuous or batch process.

When run as a continuous process the alkali preferably flows countercurrent to the substrate.

The fully wetted substrate is removed from the liquor of the Alkaline, Peroxide-Free Stage by standard separation methods known in the art. For example, filtration or centrifugation may be used. Also, the free liquid may simply be drained from the slurry. Preferably the substrate has substantially all the liquor removed leaving a damp substrate of about 20 to 50 percent consistency.

While most of the protein, fat, lignin and peroxide consuming substances are removed with the alkali solution, the damp substrate may be subjected to one or more washes to remove additional undesired material.

The damp substrate is reslurried and treated in an Alkaline-Peroxide Stage as follows.

THE ALKALINE-PEROXIDE STAGE

This Stage may be run batchwise or continuously.

The separated, wetted substrate from the Separation Step is reslurried in water and sufficient peroxide is added to bleach and further delignify the substrate. If the liquid is simply drained from the substrate in the Separation Stage, it is generally only necessary to add water and peroxide. If the substrate is washed, it may be necessary to add alkali to adjust the pH to the desired range. The initial pH of the alkaline-peroxide-substrate slurry should be less than 11.0 and preferably between 8.5 and 10.8.

The peroxide may be added all at once or over a period of time. The concentration of the peroxide in the alkaline-peroxide-substrate slurry can vary broadly but preferably is about 1% to 15% of the original dry weight of the substrate, preferably 3% to 10% and more preferably about 5% to 8%. Peroxide stabilizers such as sodium silicate, magnesium sulfate, or chelating agents such as ethylene diamine tetraacetic acid (EDTA) or diethylene triamine pentaacetic acid (DTPA) may be added.

The peroxide may be any water-soluble peroxide, such as hydrogen peroxide, sodium peroxide, sodium percarbonate, or other peroxide hydrolyzable in aqueous alkali to form $H_2O_2$ or its conjugate base, the hydroperoxide anion $HO_2^-$ and peroxy acids such as peroxyacetic acid and monoperoxysulfuric acid. $H_2O_2$ is preferred for its ready availability as a concentrated aqueous solutions, 35-70% by weight, and its ease of handling. If other than hydrogen peroxide is used, the total amount of alkali needed should be adjusted to account for the "alkali" content of the peroxide.

As Hhd $2O_2$ (pKa 10.8) is a stronger acid than $H_2O$ (pKa 14), its addition to the alkaline slurry decreases the pH of the slurry. Also, the pH decreases as hydroxide ion is consumed in neutralizing the carboxylic degradation products derived from lignin to carboxylate ions and in hydrolyzing proteins and saponifying fats and oils to carboxylate ions since carboxylate ions are substantially weaker bases than hydroxide ion. The pH should preferably be kept above 8.5.

The alkali can be any of the bases described in the Alkaline, Peroxide-Free Stage above and preferably is the same base as in that stage.

The concentration of alkali in the Alkaline-Peroxide Stage can vary broadly but preferably is at a percentage that results in an initial pH of less than 11.0 and preferably between about 8.5 and 10.8.

The total alkali, taken as NaOH, required in the overall process (both Alkaline, Peroxide-free and Alkaline Peroxide Stages) will generally not exceed 15% of the original dry weight of the substrate.

The preferred consistency of the slurry is about 5% to 30%, more preferably 10% to 20%.

The reaction mixture is preferably agitated at a sufficient temperature and time to produce a substantially delignified and bleached cellulosic fiber product. Agitation of the slurry can be in any conventional stirring apparatus, such as pipeline mixers, blenders, agitated vessel or recirculating pumps. Alternatively, a countercurrent bleaching tower may be used.

The pH is allowed to decrease during this stage. Preferably, at the end of this stage, the pH will range from 7.5 to 9.5.

The temperature for Alkaline-Peroxide Stage can vary broadly, say, about 25° to 90° C., but preferably will be about 50° to 85° C. and, more preferably, about 60° to 80° C. The preferred temperature should be selected to provide a satisfactory product in a reasonably short time.

Reaction time can be as short as 1/2 hour and as long as 24 hours, depending on the temperature. Typically, at 65°-85° C., it would take 1 to 3 hours to effectively bleach and delignify the substrate. At 50°-60° C., it would take about 3 to 6 hours, and at room temperature, it would take 15 to 24 hours.

While during the Alkaline, Peroxide-Free Stage, most of the proteinaceous, fatty and silicaceous constituents have been substantially hydrolized and removed, the reaction time in the Alkaline-Peroxide Stage should be long enough to remove additional proteinaceous, fatty and silicaceous constituents and bleach the substrate sufficiently to facilitate the use of the cellulosic fiber product as a low calorie dietary fiber.

Removal of lignin, proteins, fats and oils, silica and other ash-forming substances can be determined during or after the process by direct analysis using standard methods known to the art.

In general, the overall yield loss amounts to about 20% to about 37% of the original dry weight of the substrate.

SEPARATION OF PRODUCT

Upon completion of the alkaline peroxide treatment, the insoluble cellulosic fiber product is separated from the aqueous alkaline peroxide phase, washed with water one or more times to remove residual chemicals including alkali metal base and water-soluble compounds, neutralized as needed with any aqueous mineral acid or organic acid that is non-toxic, such as hydrochloric, nitric, sulfuric, citric, tartaric and acetic acid, rewashed with water and, if desired, dried.

Preferably, after initial water washes, enough acid is added to lower the pH to less than 2.5, preferably 2.0-2.4. The product is held at that pH with adequate mixing to assure uniform wetting of the product for a time sufficient to remove chemical residues and enhance product brightness. With normal mixing, the time should be about 15 to 30 minutes. With high efficiency mixing, shorter times can be used. Following the hold time at the low pH, the product is washed until the pH is in the range of about 4-7 and to remove additional chemical residues and water-soluble compounds.

The separated product preferably is dried in a conventional drier such as a rotary drier, a fluid bed drier, a pan drier or a spray drier. More preferably, the separated product is dewatered, for example, by pressing or by centrifugation before being dried in the drier. Drying temperatures depend on the type of drier but should be high enough to efficiently dry, but low enough to avoid charring or darkening of the product. Preferably, product temperatures should not exceed 105° C.

PRODUCT

The dried product can be ground for use as a dry ruminant feedstuff or dietary fiber for substitution at high replacement levels in flour used to make cakes, breads, pasta, pizza and other baked goods for human consumption. It can also be generally used in foods as a process aid, a anticaking agent, a binding agent or carrier. It can be used as a pharmaceutical excipient.

Particularly in the case of a dietary fiber, the product of this invention is preferably fine ground by itself or co-ground with the regular grain with which it ultimately is to be mixed. Degree of grinding effects mouthfeel of baked products containing the fiber. Regular flour can be any flour such as wheat flour, corn flour, rice flour, rye flour or oat flour and need not be from the same plant as the fiber of this invention. The co-grinding or milling may optionally be done after preblending the product and the grain. The blending and grinding preferably are performed in a manner to give uniformly distributed mixtures of regular and dietary fiber flours.

In preferred embodiments of the invention, flour substitutes having low levels (in weight %) of proteins (less than 1), fatty substances (less than 0.1) and ash-forming substances (less than 2.5) including the silica-ceous material, taken as $SiO_2$, (less than 1) and high brightness are produced.

In preferred embodiments of the invention designed to provide bleached cellulosic fiber products for use as low calorie dietary flour substitutes, the degree of whiteness of the bleached product, or its brightness value, should be high to meet the demands of the white flour industry. The brightness, as determined with a Hunter Color Difference Meter, Model D-2, of the dry product tamped flush with the rim of a round 6 cm diameter by 1.8 cm deep metal can, should be at least about 75, preferably about 80 or more. In comparison, the unbleached substrates have brightness values around 65 or less.

EXAMPLES

The following examples are intended only to further illustrate the invention and are not intended to limit the scope of the invention.

EXAMPLE 1

One hundred grams (oven-dried weight) at 90% consistency of flat, hammer-milled oat hulls (111.1 grams) were added to 888.9 grams of deionized (DI) water to make a 10 weight percent (wt. %) slurry. The slurry was heated to 65° C. Ten grams of 100 wt. % sodium hydroxide (NaOH) was then added as 32.5 grams of a fresh 30.8 wt. % NaOH solution. The pH of the slurry was about 11.5. After 30 minutes of stirring, the slurry was filtered.

The solids were then reslurried in DI water to make a 9.7 wt. slurry (1032.5 grams). The slurry was heated to 65° C. Five grams of 100% hydrogen peroxide ($H_2O_2$) per 100 grams of dry substrate (15.3 grams of a 32.6% H2O2 solution) were then added to the heated slurry. The pH at the beginning was 10.5. The slurry was agitated at 65° C. for 2 hours. The resulting reaction mixture had a pH of 9.2 and a $H_2O_2$ concentration of 0.52%.

The fibrous product was filtered off and washed four times with 500 milliliters of DI water and, then, was reslurried in DI water to make a 9.1 wt. % slurry. Total weight of the slurry was 1000 grams. To this aqueous slurrY, enough 10% hydrochloric acid (HC1) was added to keep the pH at 5 to 7 for one half hour. The fibrous product was then filtered and washed two more time with 500 ml of DI water. The product was pressed to remove the bulk of the water and dried in a fluid bed dryer for one half hour at 80° C. to a moisture content of 5%.

The resulting product had a brightness of 78.3, an ash content of 1.92%, sodium ion content of 0.30% and $SiO_2$ content of 0.48%, Process yield loss was 32.5%.

EXAMPLES 2 TO 10

The following examples demonstrate the ability to recycle both the alkali and the peroxide, thus achieving significant material savings. Also demonstrated is the preferred acid washing of delignified and bleached oat hulls claimed in copending application (CH-1564). See Examples 14 to 17 which show the brightness enhancement that comes with the acid wash.

EXAMPLE 2

One hundred grams (oven-dried weight) at 91.3% consistency of slightly shredded oat hulls having a small amount of fines (109.5 grams) were added to 890.5 grams of process water obtained from a city potable water supply to make a 10 wt. % slurry. The slurry was stirred at room temperature (23°-25° C.) for 15 minutes and then filtered without pressing.

The filtered solids were then reslurried in enough process water to make a 1000 gram slurry which was heated to 65° C. Sodium hydroxide (20.5 grams of 48.8 wt. % NaOH solution) was added to the slurry and stirred for 1/2 hour at 65° C. and a pH of 11.86. On a 100 wt. % basis, the NaOH added was 10 wt. % of the dry weight of the hulls. The solids were then filtered without pressing. The filtrate (Alkaline Filtrate) was saved for recycling.

The wet solids were then reslurried in enough process water to make a 1000 gram slurry which was heated to 65° C. and found to have a pH of 10.84. Hydrogen peroxide (21.5 grams of a 32.6 wt. % $H_2O_2$ solution) was then added to the slurry which was stirred for 2 hours with the temperature controlled at about 65° C. (temperature varied from 63° to 65° C.). On a 100 wt. % basis, the $H_2O_2$ added was 7 wt. % of the dry weight of the hulls. The pH was measured every 15 minutes. It dropped to 9.22 by the end of the 2 hours.

At the end of the 2 hours, the solids were filtered but not pressed and the filtrate was saved for recycling (Peroxide Filtrate). The residual concentration of hydrogen peroxide in the filtrate was 0.6530% compared to the theoretical concentration that would result if all of the hydrogen peroxide were recovered (0.7606%).

The filter cake was then washed five times with 500 milliliters of process water. Following the fifth wash, the filter cake was reslurried in process water to make 000 grams of slurry. Enough hydrochloric acid was added to lower the pH to and maintain it at 2.2 to 2.4 for 15 minutes. The solids were then filtered but not pressed (except for the last wash) and washed five times with 500 ml of process water each time. After the last wash, the solids were pressed to remove as much liquid as possible and then dried in a fluid bed dryer.

The dried product was found to have a brightness of 77.5, an ash content of 1.99%, a sodium ion content of 71 parts per million (ppm), a $SiO_2$ content of 0.82%, and hydrogen peroxide content of 2.7 ppm. Yield loss was 29.3%.

EXAMPLE 2A

Example 2 was rerun with an acid wash prior to the alkali extraction. A 10% solution of hydrochloric acid was added to the oat-hull-water slurry to lower its pH to 2.0. The slurry was agitated for 15 minutes at room temperature and then the solids were separated by filtration without pressing. The solids were reslurried to 1000 grams and the process was continued as in Example 2.

The dried product was found to have a brightness of 79.1, an ash content of 1.47%, a sodium ion content of 122 parts per million (ppm), a $SiO_2$ content of 0.48%, and hydrogen peroxide content was non-detectable. Yield loss was 33.45%.

EXAMPLE 3

The procedure of Example 2 was repeated except that recycled NaOH and $H_2O_2$ were used. Instead of fresh NaOH solution, 655.3 grams (2.8 grams of 100% NaOH) of the Alkaline Filtrate from Example 2 was used. 14.8 grams of fresh 48.8% NaOH solution (7.2 grams of 100% NaOH) was added to adjust the NaOH concentration to 10 wt. % of the dry weight of the hulls. Instead of fresh $H_2O_2$ solution, 495.2 grams (3.2 grams of 100% $H_2O_2$) of the Peroxide Filtrate from Example 2 was used. 11.7 grams of fresh 32.6% $H_2O_2$ solution (3.8 grams of 100% $H_2O_2$) was added to adjust the H202 concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.5543% compared to the theoretical concentration that would result if all of the hydrogen peroxide were recovered (0.7606%).

The dried solids were found to have a brightness of 78.8, an ash content of 2.47%, a sodium ion content of 134 ppm, a $SiO_2$ content of 0.98%, and hydrogen peroxide content was non-detectable. Yield loss was 30.2%.

EXAMPLE 4

The procedure of Example 2 was repeated except that recycled NaOH and $H_2O_2$ were used. Instead of fresh NaOH solution, 663.9 grams (3.19 grams of 100% NaOH) of the Alkaline Filtrate from Example 3 was used. 11.9 grams of fresh 48.8% NaOH solution (5.8 grams of 100% NaOH) was added to adjust the NaOH concentration to 9 wt. % of the dry weight of the hulls. Instead of fresh $H_2O_2$ solution, 461.3 grams (2.4 grams of 100% $H_2O_2$) of the Peroxide Filtrate from Example 3 was used. 14.1 grams of fresh 32.6% $H_2O_2$ solution (4.6 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.6156% compared to the theoretical concentration that would result if all of the hydrogen peroxide were recovered (0.7606%).

The dried solids were found to have a brightness of 77.3, an ash content of 2.03%, a sodium ion content of 123 ppm, a $SiO_2$ content of 0.77%, and hydrogen peroxide content of 2.2 ppm. Yield loss was 26.7%.

EXAMPLE 5

The procedure of Example 2 was repeated except that recycled NaOH and $H_2O_2$ were used. Instead of fresh NaOH solution, 645.7 grams (5.3 grams of 100% NaOH) of the Alkaline Filtrate from Example 4 was used. 11.9 grams of fresh 48.8% NaOH solution (5.3 grams of 100% NaOH) was added to adjust the NaOH concentration to 8 wt.% of the dry weight of the hulls. Instead of fresh $H_2O_2$ solution, 559.1 grams (2.9 grams of 100% $H_2O_2$) of the Peroxide Filtrate from Example 4 was used. 12.6 grams of fresh 32.6% $H_2O_2$ solution (4.1 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.4948% compared to the theoretical concentration that would result if all of the hydrogen peroxide were recovered (0.7606%).

The dried solids were found to have a brightness of 77.3, an ash content of 2.20%, a sodium ion content of 123 ppm, a $SiO_2$ content of 0.83%, and hydrogen peroxide content was non-detectable. Yield loss was 25.9%.

EXAMPLE 6

The procedure of Example 2 was repeated except that recycled NaOH and $H_2O_2$ were used. Instead of fresh NaOH solution, 661.2 grams (2.6 grams of 100% NaOH) of the Alkaline Filtrate from Example 5 was used. 13.1 grams of fresh 48.8% NaOH solution (6.4 grams of 100% NaOH) was added to adjust the NaOH concentration to 9 wt. % of the dry weight of the hulls. Instead of fresh $H_2O_2$ solution, 699.1 grams (2.7 grams of 100% $H_2O_2$) of the Peroxide Filtrate from Example 5 was used. 13.2 grams of fresh 32.6% $H_2O_2$ solution (4.3 grams of 100% $H_2O_2$) was added to adjust the H202 concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.3552% compared to the theoretical concentration that would result if all of the hydrogen peroxide were recovered (0.7606%).

The dried solids were found to have a brightness of 76.8, an ash content of 1.82%, a sodium ion content of 127 ppm, a $SiO_2$ content of 0.67%, and hydrogen peroxide content of 1.9 ppm. Yield loss was 27 8%.

EXAMPLE 7

The procedure of Example 2 was repeated except that recycled NaOH and $H_2O_2$ were used. Instead of fresh NaOH solution, 642.2 grams (2.9 grams of 100% NaOH) of the Alkaline Filtrate from Example 6 was used. 14.5 grams of fresh 48.8% NaOH solution (7.1 grams of 100% NaOH) was added to adjust the NaOH concentration to 10 wt. % of the dry weight of the hulls. Instead of fresh $H_2O_2$ solution, 489.5 grams (1.7 grams of 100% $H_2O_2$) of the Peroxide Filtrate from Example 6 was used. 16.3 grams of fresh 32.6% $H_2O_2$ solution (5.3 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.3580% compared to the theoretical concentration that would result if all of the hydrogen peroxide were recovered (0.7606%).

The dried solids were found to have a brightness of 75.3, an ash content of 1.79%, a sodium ion content of 168 ppm, a $SiO_2$ content of 0.51%, and hydrogen peroxide content was non-detectable. Yield loss was 26.1%.

EXAMPLE 8

The procedure of Example 2 was repeated except that recycled NaOH and $H_2O_2$ were used. Instead of fresh NaOH solution, 697.7 grams (3.7 grams of 100% NaOH) of the Alkaline Filtrate from Example 7 was used. 12.9 grams of fresh 48.8% NaOH solution (6.3 grams of 100% NaOH) was added to adjust the NaOH concentration to 10 wt. % of the dry weight of the hulls. Instead of fresh $H_2O_2$ solution, 404.9 grams (1.1 grams of 100% $H_2O_2$) of the Peroxide Filtrate from Example 7 was used. 18.1 grams of fresh 32.6% $H_2O_2$ solution (5.9 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.5098% compared to the theoretical concentration that would result if all of the hydrogen peroxide were recovered (0.7606%).

The dried solids were found to have a brightness of 77.0, an ash content of 1.68%, a sodium ion content of 115 ppm, a $SiO_2$ content of 0.66%, and hydrogen peroxide content of 2.5 ppm. Yield loss was 26.1%.

EXAMPLE 9

The procedure of Example 2 was repeated except that recycled NaOH and $H_2O_2$ were used. Instead of fresh NaOH solution, 656.7 grams (3.6 grams of 100% NaOH) of the Alkaline Filtrate from Example 8 was used. 13.1 grams of fresh 48.8% NaOH solution (6.4 grams of 100% NaOH) was added to adjust the NaOH concentration to 10 wt. % of the dry weight of the hulls. Instead of fresh $H_2O_2$ solution, 474.1 grams (2.2 grams of 100% $H_2O_2$) of the Peroxide Filtrate from Example 8 was used. 14.7 grams of fresh 32.6% $H_2O_2$ solution (4.8 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.5262% compared to the theoretical concentration that would result if all of the hydrogen peroxide were recovered (0.7606%).

The dried solids were found to have a brightness of 77.8, an ash content of 1.55%, a sodium ion content of 165 ppm, a $SiO_2$ content of 0.47%, and hydrogen peroxide content was non-detectable. Yield loss was 27.9%.

EXAMPLE 10

The procedure of Example 2 was repeated except that recycled NaOH and $H_2O_2$ were used. Instead of fresh NaOH solution, 672.8 grams (3.8 grams of 100% NaOH) of the Alkaline Filtrate from Example 9 was used. 12.7 grams of fresh 48.8% NaOH solution (6.2 grams of 100% NaOH) was added to adjust the NaOH concentration to 10 wt. % of the dry weight of the hulls. Instead of fresh $H_2O_2$ solution, 680.9 grams (2.7 grams of 100% $H_2O_2$) of the Peroxide Filtrate from Example 9 was used. 13.2 grams of fresh 32.6% $H_2O_2$ solution (4.3 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.4780% compared to the theoretical concentration that would result if all of the hydrogen peroxide were recovered (0.7606%).

The dried solids were found to have a brightness of 76.7, an ash content of 1.55%, a sodium ion content of 153 ppm, a $SiO_2$ content of 0.53%, and hydrogen peroxide content of 1.1 ppm. Yield loss was 29.8%.

EXAMPLE 11 (One Step Process—Flax Shives)

Two thousand (2000) grams of deionized (DI) water and 200 grams (oven-dried basis) of flax shives (230.6 grams at 86.71% consistency) were placed into a 4 liter beaker at 65° C. under agitation. The slurry was stirred at boiling for ½ hour and then drained in a Buchner funnel with a dental dam. The damp flax was placed in a 4 liter beaker to which enough DI water was added to a total weight of 2300 grams at 65° C. NaOH (67.5 grams at 29.64% or 10% of the weight (oven-dried basis) of the shives) was added resulting in a pH of 11.42. The resulting slurry was stirred for 15 minutes then hydrogen peroxide (33.1 grams at 30.5% or 5% of the weight (oven-dried basis) of the shives) was added. The slurry was stirred at 65° C. for 2 hours. The solids removed were washed 3 times with DI water and acidified with hydrochloric acid to a pH of 6.0 and then dried. Hydrogen peroxide decomposition was high and the final dried product had a brightness of 71.6 (Untreated flax shives had a brightness of 53.5) The yield loss was 29.88%.

EXAMPLE 12 (NaOH Extraction, with pH adjusted to 11 before adding hydrogen peroxide in next stage)

Two thousand (2000) grams of deionized (DI) water and 200 grams (oven-dried basis) of flax shives (230.6 grams at 86.71% consistency) were placed into a 4 liter beaker at 65° C. under agitation. NaOH (20.2 grams at 29.64% or 3% of the weight (oven-dried basis) of the shives) was added and the resulting slurry was stirred at 65° C. for 1 hour and then drained in a Buchner funnel with a dental dam and washed once with DI water. The damp flax was placed in a 4 liter beaker to which enough DI water was added to a total weight of 2300 grams at 65° C. pH was 9.87. NaOH (7.89 grams at 29.64% or 1.2% of the weight (oven-dried basis) of the shives) was added resulting in a pH of 11.04. Then hydrogen peroxide (33.1 grams at 30.5% or 5% of the weight (oven-dried basis) of the shives) was added. The slurry was stirred at 65° C. for 2 hours. The solids removed were washed 3 times with DI water and acidified with hydrochloric acid to a pH of 6.0 and then dried. Hydrogen peroxide decomposition was less than in Example 11 (residual after 2 hours was 0.1821% or 38.8% of theoretical versus 0% after only 1 hour in Example 11), the final dried product had a higher brightness of 77.1 versus 71.6 (Untreated flax shives had a brightness of 53.5), and the yield loss was 20.9% versus 29.88%.

EXAMPLE 13 (Paper Example Showing expected results when pH is not adjusted after NaOH extraction)

It would be expected based on other examples that the residual hydrogen peroxide when using the conditions of Example 12 without the second addition of NaOH (initial pH of 9.87) or with the addition of less NaOH so that the initial pH is less than 10.8 would be significantly greater (about 55 to 85% of theoretical).

ACID PURIFICATION OF PRODUCT

Acid purification will improve the product and the baked products made therefrom. It is effective on substrates that are bleached and delignified by any alkaline peroxide process. For instance, the following examples were run using product made by the process of copending application to Jayawant (CH-1459).

One thousand grams (oven-dried weight) at 91.3% consistency of slightly shredded oat hulls having a small amount of fines (1095.3 grams) were added to 13,190.4 grams of deionized (DI) water at 65° C. to make a 7 weight percent (wt. %) consistency slurry. One hundred grams of 100 wt. % sodium hydroxide (NaOH) was then added as 225.7 grams of a fresh 44.3 wt. % NaOH solution. The pH of the slurry was about 11.45. After the hulls were uniformly wetted, 50 grams of 100% hydrogen peroxide ($H_2O_2$) were then added as 153.4 grams of a 32.6% H2O2 solution to the heated slurry. The slurry was agitated at 65° C. for 2 hours. The resulting reaction mixture had a pH of 10.35 and a $H_2O_2$ concentration of 0.0599%.

The fibrous product was filtered off in a nutsch through cheese clothe and separated into 9 bags each weighing 340 grams and one weighing 310 grams for use in the following experiments. The results of the experiments are shown in the table that follows the examples.

EXAMPLE 14

One bag was split into two samples of about 155 grams each. One (14A) was washed 4 times with 250 grams of DI water each time at room temperature. After the fourth wash, the substrate was reslurried to a total weight of 700 grams with DI water and 1.3 grams of hydrochloric acid was added dropwise to hold the pH between 5.0 and 7.0 for ½ hour. The solids were then filtered (the filtrate had a pH of 6.2) and were washed 2 times with 250 grams of DI water at room temperature. The other sample (14B) was treated in the same manner except at a temperature of 90° C. in which case the filtrate had a pH of 5.75.

EXAMPLE 15

Substrate from one bag (340 grams) was placed in a Buchner funnel and washed four times with 500 milliliters (ml) of DI water and, then, was washed 12 times with DI water with sufficient hydrochloric acid to obtain a pH of 3.0 for the wash water. The pH of the filtrate was measured each time and found to drop to 9.16 after the first wash to 7.38 after the twelfth. The substrate was then washed 2 more times with 500 ml DI water and dried.

EXAMPLE 16

Substrate from one bag (340 grams) was placed in a Buchner funnel and washed four times with 500 ml of DI water and, then, was washed 10 times with DI water with sufficient hydrochloric acid to obtain a pH of 2.5 for the wash water. The pH of the filtrate was measured each time and found to drop to 9.18 after the first wash to 5.34 after the tenth. The substrate was then washed 2 more times with 500 ml DI water and dried.

EXAMPLE 17

Substrate from one bag (340 grams) was placed in a Buchner funnel and washed four times with 500 ml of DI water and, then, was washed 3 times with DI water with sufficient hydrochloric acid to obtain a pH of 2.0 for the wash water. The pH of the filtrate was measured each time and found to drop to 2.54 after the first wash to 2.12 after the third. The substrate was then washed 2 more times with 500 ml DI water and dried.

TABLE

| Example | Brightness[a] | Ash (wt. %) | Na+ (wt. %) | SiO2 (wt. %) | H2O2 Residue (ppm) |
|---|---|---|---|---|---|
| 14A | 75.8 | 1.88 | 0.35 | 0.39 | not measured |
| 14B | 75.7 | 1.92 | 0.35 | 0.39 | not measured |
| 15 | 74.5 | 2.11 | 0.45 | 0.41 | 3.2 |
| 16 | 74.5 | 1.95 | 0.3S | 0.44 | 4.4 |
| 17 | 77.1 | 1.50 | 0.09 | 0.45 | less than 3.0 |

[a]Hunter Color Difference Meter D2 ratings.

EXAMPLE 18—Bake Tests

Suitability of the product for use as a flour substitute ultimately is determined by bake tests. The product ("Fiber") made according to the process in Examples 2 through 10 were submitted for such tests which were run according to the following procedure:

1. The product ("Fiber") was mixed with wheat (white bread) flour at a 40 weight percent replacement level.
2. Bread was made by the "Sponge and Dough" method under standard baking conditions. A sponge was first made by mixing the following ingredients in a Hobart A-120 mixer with a McDuffee bowl and a three-prong hook for 1 minute at the low (no. 1) speed and then for 1 minute at the middle (no. 2) speed at 77°±1° F.:

| Ingredients | Weight (grams) |
|---|---|
| Bakers Patent Flour | 300 |
| Fiber[a] | 200 |
| Vital Yeast Glutton | 30 |
| Mineral Yeast Food | 3 |
| PD-321 | 2.5 |
| XPANDO | 5 |
| Compressed Yeast | 15 |
| Water | 700[b] |

[a]Laboratory Pin Milled
[b]cubic centimeters

The sponge was fermented in a fermentation box for 3 hours at 86° F. and 85% relative humidity and then remixed with the following additional "Dough" ingredients for 1 minute at No. 1 speed and then to development at No. 2 speed (about 10 minutes):

| Ingredients | Weight (grams) |
|---|---|
| Bakers Patent Flour | 200 |
| Vital Wheat Glutton | 30 |
| Salt | 15 |
| Calcium Propionate | 2.5 |
| Compressed Yeast | 10 |
| High Fructose Corn Syrup | 35[a] |
| Water | 100[a] |

-continued

| Ingredients | Weight (grams) |
| --- | --- |
| Ascorbic Acid | 10[a] |

[a] cubic centimeters

The remixed dough was allowed to rest in the fermentation box for 10 minutes at 86° F. and 85% relative humidity and was then divided into 520 gram pieces, rounded by hand, molded in a cross grain molder and proofed at 110° F. and 81% relative humidity for about 1 hour until it had doubled in size. The loaves were then baked at 430° F. for 18 minutes in pans having top inside dimensions of 4 ⅜ inches by 10 inches, bottom outside dimensions of 4 ¾ inches by 9 ⅜ inches and a depth of 2 ¾ inches.

3. A "Score" was determined for the loaves by trained laboratory personnel in the baking laboratory. They evaluated the height of the loaf (50), color (10), aroma (10), taste (10), graininess (10), and texture (10) Each criteria is measured against the maximum point value in the parentheses. The total point value for all the criteria is 100.

The bread baked using the product of the process in which no alkali or peroxide are recycled and that using the product from the recycling processes had the same bake scores. The breads predictably had decreased height, texture and graininess ratings because the fiber was laboratory pin milled. Finer grinding, particularly if the Bakers Patent Flour and the product were co-ground, would be expected to yield a bread with improved height, texture and graininess having a total score in excess of 90. The ratings were: Height—40, Color—8, Aroma—8, Taste—8, Graininess—6, and Texture—6 for a total score of 76. The bread had 40 calories per 28 grams.

As a comparison Colonial Standard "Lite Bread", a commercial low calorie bread containing half the fiber and having 40 calories per 21 grams was used a the standard with the following ratings: Height—50, Color—10, Aroma—10, Taste—10, Graininess—10, and Texture—10 for a total score of 100.

I claim:

1. An improved process for converting nonwoody lignocellulosic substrates into products digestible by ruminants and ingestible by humans comprising the following steps:
   (a) forming a slurry of the substrate with aqueous alkali in an amount at least sufficient to uniformly wet the substrate, the alkali present in an amount greater than about 1 percent (calculated as sodium hydroxide) of the dry weight of the substrate, the slurry being substantially free of peroxide;
   (b) maintaining the slurry of step (a) for a sufficient time depending on the substrate, the temperature, the alkali concentration and mixing efficiency, the temperature being about 25° to 100° C. for the alkali to uniformly wet the substrate;
   (c) separating the wetted substrate from the aqueous alkali in the slurry; then
   (d) forming a slurry of the wetted substrate in an alkaline peroxide solution containing about 1 to 15 wt. % peroxide based on the original dry weight of the substrate at a temperature of about 25° to 90° C. and an initial pH of about 8.5 to 11.0;
   (e) maintaining the slurry of step (d) for a time sufficient to produce a substantially bleached, cellulosic fiber that is sufficiently delignified to expose substantially all the cellulosic and hemicellulosic components to facilitate its intended use; and
   (f) separating the bleached fiber from the alkaline peroxide.

2. The process of claim 1 wherein the substrate comprises the hulls of cereal grains.

3. The process of claim 2 wherein the substrate comprises oat hulls.

4. The process of claim 1 wherein the substrate is comminuted prior to step (a).

5. The process of claim 1 wherein the alkali is sodium, calcium or potassium hydroxide or carbonate.

6. The process of claim 5 wherein the alkali is sodium hydroxide.

7. The process of claim 1 wherein the aqueous alkali from step (c) is recycled to step (a) and the alkaline peroxide from step (f) is recycled to step (d).

8. The process of claim 1 wherein the wetted substrate of step (c) is washed with water prior to forming the slurry of step (d).

9. The process of claim 4 wherein the substrate is washed prior to step (a).

10. The process of claim 9 wherein the substrate is washed with dilute acid prior to step (a).

11. The process of claim 10 wherein the substrate is maintained at a pH of about 2.0 for a time sufficient to fully soak the substrate and is then drained prior to step (a).

12. The process of claim 1 wherein the substrate is straw or flax shives.

13. The process of claim 1 wherein the alkali in step (b) is present in a concentration between about 1 and 15 weight percent (calculated as sodium hydroxide) of the dry weight of the substrate.

14. The process of claim 2 wherein the alkali in step (b) is present in a concentration between about 4 and 12 weight percent (calculated as sodium hydroxide) of the dry weight of the substrate.

15. The process of claim 12 wherein the alkali in step (b) is present in a concentration between about 1 and 6 weight percent (calculated as sodium hydroxide) of the dry weight of the substrate.

16. The process of claim 14 wherein the concentration is about 10 weight percent.

17. The process of claim 15 wherein the concentration is about 4 weight percent.

18. The process of claim 1 wherein the peroxide is hydrogen peroxide.

19. The process of claim 19 wherein the hydrogen peroxide is present in step (d) in a concentration greater than 1 percent of the weight (oven-dried basis) of the substrate.

20. The process of claim 19 wherein the concentration is between about 3 and 10%.

* * * * *

UNITED STATES PATENT AND TRADEMARK OFFICE
CERTIFICATE OF CORRECTION

PATENT NO. : 4,957,599

DATED : Sept. 18, 1990

INVENTOR(S) : Yu-Chia T. Chou et al

It is certified that error appears in the above-identified patent and that said Letters Patent is hereby corrected as shown below:

On The Title Page, Item [75];

"Madhusudan D. Jayawant, Hockessin, Del.", should be added after --Canada--.

Signed and Sealed this

Seventh Day of July, 1992

Attest:

DOUGLAS B. COMER

*Attesting Officer*  *Acting Commissioner of Patents and Trademarks*